US006825753B2

(12) United States Patent
Cardinale et al.

(10) Patent No.: US 6,825,753 B2
(45) Date of Patent: Nov. 30, 2004

(54) TIME-LOCK BOX

(76) Inventors: Salvatore J. Cardinale, 418 Maple St., Mill Valley, CA (US) 94941; Richard Morse, 3030 Bridgeway, Suite 405, Sausalito, CA (US) 94965

(*) Notice: Subject to any disclaimer, the term of this patent is extended or adjusted under 35 U.S.C. 154(b) by 0 days.

(21) Appl. No.: 09/228,194

(22) Filed: Jan. 11, 1999

(65) Prior Publication Data

US 2003/0090364 A1 May 15, 2003

(51) Int. Cl.[7] .......................... H04Q 1/00; G05B 19/00
(52) U.S. Cl. ..................................... 340/5.73; 70/278.1
(58) Field of Search .............................. 340/5.28, 5.32, 340/5.33, 5.54, 5.7, 5.73, 636; 70/278.1

(56) References Cited

U.S. PATENT DOCUMENTS 3,660,998 A 5/1972 Ishijima
3,798,937 A 3/1974 Sysk
3,851,506 A 12/1974 Simon
3,950,678 A * 4/1976 Brewer ........................ 340/5.7
4,369,641 A * 1/1983 Wallach ...................... 340/5.23
4,508,260 A 4/1985 Keir et al.
4,655,061 A 4/1987 Nishikawa et al.
4,850,623 A * 7/1989 Franklin .................... 70/278.1
5,129,536 A 7/1992 Robinson
5,387,903 A 2/1995 Cutter et al.
5,594,430 A 1/1997 Cutter et al.
5,701,770 A * 12/1997 Cook et al. ................ 340/5.73
5,774,059 A * 6/1998 Henry et al. ............... 340/5.23
5,793,287 A * 8/1998 Anderson .................. 340/5.73
6,000,609 A * 12/1999 Gokcebay et al. ......... 340/5.23
6,426,699 B1 * 7/2002 Porter ........................ 340/5.9

* cited by examiner

*Primary Examiner*—Brian Zimmerman
(74) *Attorney, Agent, or Firm*—Thomas W. Cook

(57) ABSTRACT

A lockable storage assembly, or lockbox container, is disclosed, with programmable opening utility, for providing access to the contents of the storage assembly at a time chosen by a user to suit an occasion. The lockbox includes non-volatile memory for holding current time and date, and opening time and date, and is assembled of integrated circuits and display, requiring very low power, such that the lockbox may retain function over extended periods of time, while locking mechanisms with higher power requirements are powered by a replaceable, externally accessible battery. The lockbox is assembled and programmed so that the interior is accessible only upon reaching a match date, whereupon the lockbox unlocks automatically, or upon entry of a password chosen by the user.

19 Claims, 13 Drawing Sheets

TIME-LOCK BOX

TECHNICAL FIELD OF THE INVENTION

The present invention relates to time lock storage. More particularly, the present invention relates to a new lockable storage assembly with programmable opening actuation and status display, primarily used for providing access to the contents of the storage assembly at a time chosen by a user to suit an occasion.

BACKGROUND ART OF THE INVENTION

Time locks and time-accessible containers having access at predetermined times are not new. Timed storage devices have been developed to accomplish a variety of tasks, such as limiting the frequency of smoking by making cigarettes unavailable, limiting the frequency of eating by preventing access to food, and dispensing medicines.

All of these devices have a means for locking the container against unrestricted access to the interior of the container, and mechanisms for setting a predetermined time at which the container may be opened. However, the function of each prior invention determines, and limits, its capabilities. Thus, for inventions which are designed to limit access to cigarettes, the user is locked out of the container for a period ranging from 15 minutes to perhaps three hours. For inventions designed to dispense medicines, the user is limited to setting an access time up to perhaps a day, while a user may perhaps extend this time somewhat for time lock food containers. No invention to date allows a user to set a predetermined time for opening of the container at a desired predetermined time in the future in excess of a day or two; each invention in the prior art is instead keyed on biological time periods, generally the time period one might reasonably expect to allow between successive smokes, doses, or meals.

Moreover, the methods by which users set a predetermined time between successive openings of the containers in the prior art does not allow setting the time for opening incrementally into the future. Rather, each invention in the prior art provides only for opening after relatively large, set period, such as one hour, two hours, or a day.

Further, the methods by which users set a predetermined time between successive openings of the containers in the prior art does not allow setting the time for opening at a specific calendar day or time of day. Rather, each invention in the prior art provides only for opening at a time interval after the closing of the container, or at a time interval after otherwise setting the time for opening.

Further, the apparatus of the prior art do not provide any means for keeping the apparatus supplied with electrical power for the extended periods of time envisioned for closing items within the container of this invention, periods of time which may run only minutes, or years into the future. Rather, each invention in the prior art, to the extent it provides for power to run electronic components, anticipates only so much power as is necessary to their purpose, power which may be supplied without backup or alternate power sources.

Finally, the apparatus of the prior art do not provide information on the length of time the container has been closed, the length of time left to unlocking, time of day, date, or other information useful to the user, nor do they generally provide audible or visual indications that the container is either open or closed.

The present invention is a new time lock container apparatus for containing objects, such as rings, papers, or other items, in which the user may set a time and date for opening in the future. The purpose of the present invention is to prevent access to the contents of the container, as with other inventions in the prior art, however the nature of the objects placed within the container require capabilities not heretofore found. Thus, one might place a ring in the container, and set the timer of the container to open on the date of an anniversary, whether the anniversary is one month away, or some date indefinitely in the future. Or one might place a savings bond in the container, and set its opening for the maturity date of the bond. In any event, the container of the present invention is a place of safe keeping for some set period of time, or perhaps a toy or novelty item for keeping objects for some set period of time, the length of such time being chosen by the user or the manufacturer in light of the purpose at hand.

DESCRIPTION OF THE PRIOR ART

The use of time locking containers of various designs and configurations is known in the prior art. Such designs include:

U.S. Pat. No. 3,660,998 to Ishijima, which discloses a cigarette holder with time locking mechanism.

U.S. Pat. No. 3,762,601 to McLaughlin, which discloses a medication dispensing cabinet.

U.S. Pat. No. 3,798,937 to Sysk, which discloses a cigarette holder with time locking mechanism.

U.S. Pat. No. 3,851,506 to Simon, which discloses a cigarette holder with time locking mechanism.

U.S. Pat. No. 4,367,955 to Ballew, which discloses a medication container with timer top.

U.S. Pat. No. 5,129,536 to Robinson, which discloses a food container with time locking mechanism.

A number of other patents relate to various timers, such as that found in U.S. Pat. No. 4,361,408 to Wirtschafter, which discloses a timer and alarm apparatus for use with medication containers, and a large number of time lock mechanisms for use in bank vaults and the like.

While the devices disclosed in these prior patents fulfill their respective objectives, these prior patents do not describe or suggest a device for storing objects for a selected period of time, such period of time chosen by the user to correspond to any future date and time, while displaying information about the time passed since closing the container, and the time remaining to opening of the container, and other information desirable to the user.

In this respect, the time lock container of the present invention substantially departs from pre-existing designs of the prior art, and in so doing provides the user with a means for accomplishing all of the above tasks. By using the invention disclosed herein, the user thereby gains the desirable abilities to set a time and date for opening of the container, whether a set period in the future or at a particular calendar time and date, and to thereby hold selected objects secure, for the user or someone else, until the arrival of the selected instant for opening, while displaying a variety of useful or desirable information on the status of the container, or other useful or desirable information.

DISCLOSURE OF INVENTION

SUMMARY OF THE INVENTION

The present invention overcomes the problems and disadvantages of the prior art by allowing users to program the opening of the time-lock container of the present invention (referred to herein as the "lockbox," or the "time-lock box"), and by providing a display by which the programming, and other functions of the timed closure of the invention, may be monitored.

More specifically, the lockbox of the present invention consists of a container main body having an opening, through which objects may be passed so as to be placed within the container, and a container door or other closure, by which a user may prevent access to the interior of the container. A means for securing the container door to one or more sides of the container main body is provided whereby a user may lock the door in position, thereby making the interior of the container inaccessible. A locking mechanism between the door and the main body of the container may be engaged, by the physical action of the user, so as to lock upon closing the door. The locking mechanism may be disengaged according to the wishes of the user, by instructions supplied by the user and held in memory within a set of components designed to actuate the locking mechanism (the set of actuating components referred to herein as the "programmable closure utility").

The programmable closure utility of the present invention includes a micro processor, a timer, non-volatile read-only (ROM) or flash type, volatile random access (RAM) memory, an interrupt, and a display, all of which components may be of standard, off-the-shelf designs common in the electronics industries. Further, the programmable closure utility includes a programming interface by which a user may affect the status of the closure, and program the closure of the invention according to the user's wishes. This interface may be as simple as one or more buttons or switches, or as complex as a serial port, to which the user's programmable computer may be connected, however this interface commonly consists of a standard ten-key keypad. Whether simple buttons, keypad, or serial port, the programming interface is mounted on any convenient exterior surface of the container body, and electrically connected to the input and output ("I/O") pins of the micro processor, or electrically connected to a separate I/O unit which is in turn connected to the micro processor.

A locking interface is disclosed by which the user, through the programmable closure utility and an appropriately powered motive device, may affect the locking mechanism. This locking interface may consists of a small direct current motor, servo, solenoid, or other actuator electrically (singly or in combination, the "actuator") connected to the programmable closure utility and an appropriate power source, to energize the actuator, which actuator is also mechanically connected to a deadbolt or other latching means attached to the container body or to the door, to slide the deadbolt or other latching means into engagement with a corresponding hole, eyelet, or other receiving piece.

A display interface is disclosed by which the user, through the programmable closure utility and a liquid crystal display ("LCD") or other display means, may observe the status of the container closure, and may observe other messages set for display by the user or the manufacturer. The display interface is electrically connected to the programmable closure utility, on one side, and to a LCD unit or other alphanumeric display means on the other side. Whatever the form of the display means, the display unit is designed to be large enough to display at least the current time and date. The display may in the alternative, or in addition, show the time remaining until the current time and date matches a target date set by the user or manufacturer. The display may in the alternative, or in addition, show the alphanumeric sequence necessary to access the interior and programming functions of the invention (the "password"), along with numbers or characters corresponding to various other messages useful to the user or to someone to whom the user gives the lockbox.

The micro processor utilizes timers and a real time clock, of energized crystal, integrated circuit, or other design, to accomplish various timing functions of the programmable closure utility, including accounting for daylight savings time and leap years. The timing functions include maintaining the current date and time, for use by the micro processor in creating a "matching" date and time as the current date and time approaches, and then "matches," one or more dates and times set by the user, otherwise referred to herein as a "target date." The matching dates and times are then used in display of the current time and date by the LCD or other display means, in display of the time remaining before opening of the container, in timing the display of various messages set by the user for display by the LCD or other display means at certain times, in timing the activation of the locking interface and associated motor, servo, or solenoid for unlocking the container, in controlling the functions of the microprocessors and I/O components, and in other timing operations.

A power source is also disclosed consisting of a main battery, accessible only from the interior of the container when the container is open, and an auxiliary battery, accessible from the exterior of the container. The auxiliary battery in normal operation powers the motor, servo solenoid, or other actuator which unlocks or opens the lockbox at the time or date set by the user. The power source may also utilize a means for switching power from the main battery to the auxiliary battery, or from the auxiliary battery to the main battery, upon discharge of either battery, or upon changing of one of the batteries. The power source may also have a means for indicating to the user or others, through a display means, that the main battery is discharged or almost discharged. The power source may also utilize a switch to apply power from the auxiliary battery to the motor, servo, or solenoid, as desired or necessary, to open the container, typically a MOSFET semiconductor of appropriate specifications.

The micro processor may begin operating by executing a series of instructions (or "program") supplied by the manufacturer. The program is designed to allow the invention to accomplish all of its designed tasks. Upon insertion of the main battery, the micro processor is energized, and the invention commences operation. Upon commencing operation, the instruction set causes the micro processor to present an initial series of screens on the display means by which the user is requested to enter information to matching the current password.

After the password is supplied by the user, the programmable closure utility then displays, in "normal" operation, a series of screens on the display means by which the user may discern the status of the programmable closure utility. Information available to the user through the display means during this time may include the current time, the current date, the target time, the target date, the number of days left between the current date and the target date, the words "enter password," or other requests for information to be supplied by the user, and various other messages set by the manufacturer or the user and stored in memory. These various items of information may be displayed in an alternating series of screens on the display means, or by simply scrolling from one screen to the next by using an appropriate programming means.

The programmable closure utility may further be programmed to respond to a key stroke supplied by the user through the programming interface by accepting further information supplied by the user if the current password is supplied. The user may then be allowed to open the lockbox to reset the password or to reset the time or date for timed opening of the invention. The programmable closure utility may further be programmed to respond to a date match or a time and date match so as to energize the latching mechanism through the locking mechanism interface, to energize an audible or visual signal or special effect, and to return to the initial series of screens to begin its operation anew after securing a new password from the user.

In use the user of the present invention may insert the main battery and the auxiliary battery into their places provided, within the container and within a compartment accessible from the exterior of the container respectively. The user is provided initially with instructions on programming the programmable closure utility, including the initial password. Utilizing the instructions, the initial password, and the programming interface, the user may program the programmable closure utility to accept a new password of the user's choice, information on the current date and time, information on a date and time in the future when the container will achieve its unlocked state, instructions for user-specified messages which are to appear on the LCD or other display means, and other instructions made available to the user by the instruction set running on the programmable closure utility. The instructions provided through the programming interface are presented to the user during programming by the display means.

In operation, the programming of the invention may be accomplished through use of the buttons, switches, or keys of a key pad. In the alternative, a user may connect the serial port on the container of the present invention to a similar port on the user's computer, and thereby employ the computer as the means to set the time and day upon which the container will open, or to set a period of time during which the container will remain closed, or to provide instructions for display of messages, or to provide other instructions for operation of the programmable closure utility. The signals supplied during the programming of the invention may be transmitted to the programmable closure utility by electrical connections between the utility and the buttons, switches, keys, or serial port.

The user may then place a valuable or interesting object within the container, and close the container, thereby locking it as the deadbolt or other latching means attached to the main body or the door slides into place, thereby engaging its corresponding receiving piece. In some embodiments of the invention, an indicating device, perhaps in the form of a micro switch, may be triggered upon closure of the container to send a signal to the micro processor as to the status of the locking mechanism. From the time of engagement of the latching means with its receiving piece, the container may not again be opened (without breaking the container) unless one wishing access to the interior of the container possesses the password, or unless the current date and time set by the user prior to closure matches the target time set by that user.

While the container remains closed, and before a time match is made, the display means displays the current date, and time, and/or the time remaining until the container may be opened, or a message set by the user or manufacturer as set forth above. During this time, a user may attempt to open the container by activating the programming interface, whereupon the programmable closure utility is instructed to request from the user, through the display means, for the password. If the user enters the current password within a reasonable period of time after a request for password, the programmable closure utility is programmed to allow the user to open the container. Upon opening, a user can reprogram the programmable closure utility, including entering a new password in the manner set forth above, and re-use the container according to its overall purpose. However, if the user delays an unreasonable time after the request for password before supplying the currently correct password, or if an incorrect password is entered, the programmable closure utility is programmed to return to its previous status, and continue with display of the date, day, and time, or other message on the display means.

In one embodiment of the invention, the programmable closure utility may be pre-programmed by the manufacturer, and sold in a locked state. In such case, the password is set by the factory, however the password and functions of the invention may be re-programmed by the user after initial opening. In another embodiment of the invention, the manufacturer may pre-program the programmable closure utility and also place an object inside the container. In such embodiment, the programming interface and display interface need not be supplied as components of the invention, the invention being intended for a single opening at the target date.

When a match is made between the current date and the target date, or between the current date and time and the target date and time, the programmable closure utility causes the locking interface to activate motor, servo or solenoid electrically, so as to open the locking mechanism. This allows the door of the container to be opened, thereby providing access to the interior of the container, and to the valuable or interesting object contained therein. The container and door may also be attached to each other in such fashion as to urge the door to open, thereby exposing the interior of the container, as well as simply unlock, thereby allowing a user to manually open the door and expose the interior.

The more important features of the invention have thus been outlined, rather broadly, so that the detailed description thereof that follows may be better understood, and in order that the present contribution to the art may be better appreciated. Additional features of specific embodiments of the invention will be described below.

However, before explaining preferred embodiments of the invention in detail, it may be noted briefly that the lockbox of the present invention provides the opportunity to set the functions of the container, including the current password which allows the only access to the container prior to achieving the user-selected time match, close the container, and present the container to another with assurance that the one to whom the container is presented can have access to the container contents only at some time in the future selected by the user (or before if the user applies the password to open the container for the recipient). The user is therefore provided a means for presenting a gift to another at some time in the future, while giving that other possession of the container containing the gift in the meantime. This is accomplished through the expedient of a lockbox having the special features noted above, particularly the facility to program the functioning of the box, wherein the box may be set by a user to open at some time or date in the future consistent the programming and the instructions of the user. Such advantages have not been hitherto available to users.

OBJECTS OF THE INVENTION

The principal object of the present invention is to provide a container for holding objects, or lockbox, which may be set to unlock or open at any future date or time.

A further principal object of the present invention is to provide a lockbox in which the means for access to the box, or password, as well as the date and time of opening, is determined and set by the user or manufacturer consistent with an instruction set, or programming, provided by the manufacturer.

A further object of the present invention is to provide a lockbox in which the status of the lockbox may be determined by a user or others through the user interface and display, and messages may be displayed for observation by the user or others.

A further object of the present invention is to provide a lockbox in which a user possessing the current password may at any time set a new password and date and time of opening, through a user interface and display accessible and understandable to the user and others.

A further object of the present invention is to provide a lockbox in which a new password and date and time of opening may be set by a user or manufacturer through the user interface and display when the lockbox is open.

A further object of the present invention is to provide a lockbox in which the user and others are made aware that the box is open or unlocked by one or more tones, lights, alphanumeric message appearing on the user interface, or other means.

A further principal object of the present invention is to provide a lockbox in which the password, as well as the date and time of opening, may be determined and set by the user or manufacturer utilizing a connection to a separate computer or network.

A further object of the present invention is to provide a lockbox which is portable, as at least one means for powering the functioning of the box is a main battery, accessible only to a user possessing the current password, which is the principal power source for running the programming functions of the box, and an auxiliary battery, which supplies power for actuating the opening motor, servo, solenoid, or other actuator.

A further object of the present invention is to provide a lockbox in which the user is provided with information on the charge remaining in the main battery, and in which an auxiliary battery powers the programming functions of the lockbox during main battery changes.

BRIEF DESCRIPTION OF DRAWINGS

The accompanying drawings, which are incorporated in and constitute a part of this specification, illustrate one embodiment of the invention and, together with the description, serve to explain the principles of the invention.

DESCRIPTION OF A PREFERRED EMBODIMENT

Figure 1:
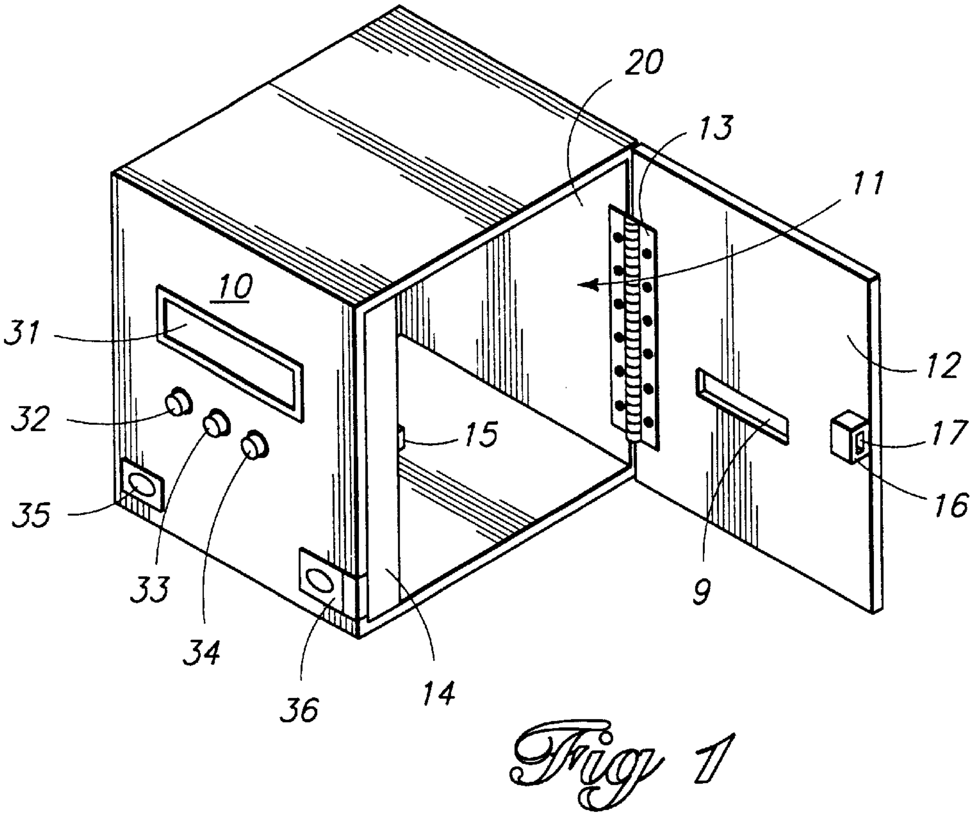
FIG. 1 is a perspective view of a first generally cubically shaped preferred embodiment of the present invention in an open configuration.

Referring initially to FIG. 1, a preferred embodiment of the lockbox container of the present invention is shown in perspective view. The main body 10 of the lockbox is generally cubical in shape, with an opening 11 through which objects may be passed so as to be placed within the container. The lockbox is furnished with a door 12, which may be fastened to the main body 10 by one or more hinges 13 or other fastening means, or affixed to or within the opening 11 of the main body 10. FIG. 1, the door 12 is shown in an open configuration. The door 12 is formed so that it may be closely fitted over opening 11, to thereby entirely cover the opening 11 when the door 12 is shut against the main body 10 over the opening 11. The fastening means for affixing the door 12 to the opening 11 is of a type that cannot be loosened or released from the exterior of the main body 10 when the door 12 is shut. The main body 10 has within it at least one interior compartment 14 for holding electrical and mechanical components which equip the lockbox with its functional capabilities. The interior compartment 14 may therefore be accessed by a user only when the door 12 is open. The remainder of the interior of the main body 10 of the container may be utilized as a storage compartment for holding objects upon closure of the door 12 over the opening 11.

Figure 2:
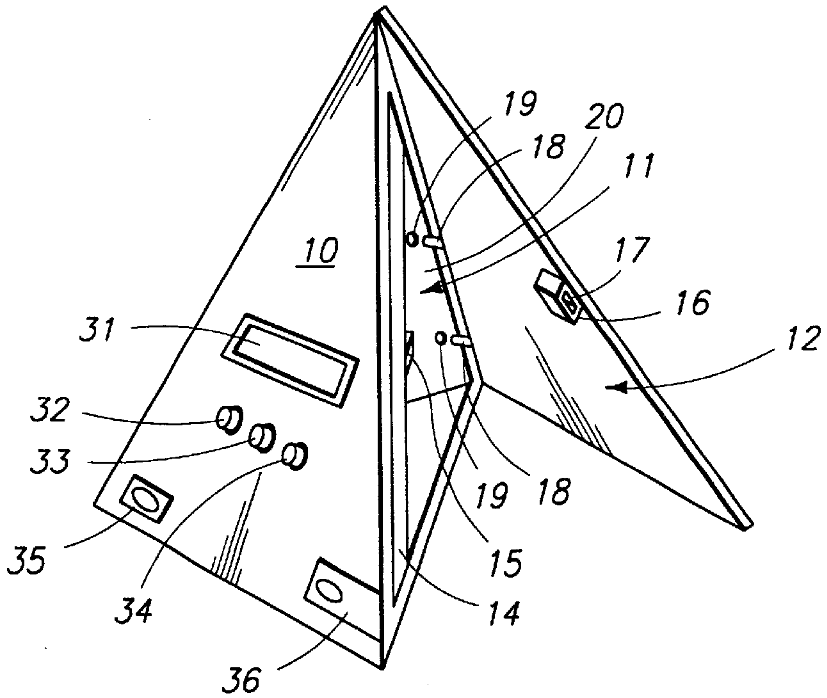
FIG. 2 is a perspective view of a second generally pyramidally shaped preferred embodiment of the present invention in an open configuration.

In FIG. 2, a second preferred embodiment of the lockbox container of the present invention is shown, also in perspective view. The main body 10 of the lockbox is, however, generally pyramidal in shape, with the opening 11 through which objects may be passed having a generally triangular shape. The lockbox door 12 of FIG. 2 is generally also correspondingly triangular in shape so that it may be closely fitted over opening 11, to thereby entirely cover the opening 11 when the door 12 is shut. However, in FIG. 2 the door 12 is formed of a size such that it may be affixed within the opening 11 of the main body 10. In FIG. 2, the door 12 is also shown in an open configuration. The fastening means for affixing the door 12 within the opening 11 is again of a type that cannot be being loosened or released from the exterior when the door 12 is shut within the opening 11 of the main body 10. In FIG. 2, the fastening means consists of a plurality of pins 18 affixed into the edge of the door 12 and spaced to fit within a plurality of holes or depressions 19 in at least one interior wall 20 of the main body 10. The interior compartment 14 for holding electrical and mechanical components to equip the lockbox with its functional capabilities also appears in FIG. 2.

The door 12 in FIGS. 1 and 2 is also fitted with a latching means between the door 12 and the main body 10 of the container. One portion of the latching means may consist of a deadbolt 15, or other locking hardware, which may be situated on or partially within the interior compartment 14, or close to the interior compartment 14 on an interior wall 20 of the main body 10. The other portion of the latching means may consist of a deadbolt receiving piece 16 affixed to the door 12, which receiving piece 16 is formed with a hole or depression 17 of a size and shape suitable for engagement with the deadbolt 15. Accordingly, the deadbolt 15 may be engaged with the receiving piece 16 by the physical action of the user as the deadbolt 15 slides against the receiving piece 16 for engagement with the corresponding hole or depression 17 upon closing the door 12 against the opening 11 of the main body 10. The latching means is actuated by a locking mechanism enclosed within the interior compartment 14.

FIGS. 1 and 2 also show a liquid crystal display, or "LCD," 31, by which the user or others may observe the status of the container closure and other messages. The invention may in the alternative be provided with another display means with alphanumeric display capability. The LCD is designed to be large enough to display at least the current time and date, however the display may also display the time remaining until the current time and date matches a target date set by the user or manufacturer, it may show the alphanumeric sequence necessary to access the interior and programming functions of the invention, and it may display characters corresponding to various messages.

In addition, FIGS. 1 and 2 also show the exterior portions of a programming interface by which a user may affect the status of the closure, and program the closure of the invention according to the user's wishes. In these figures, this programming interface is represented by program key switches 32, 33, and 34. By pressing the first program key switch 32, the user may advance through the programming of the programmable closure utility, thereby allowing the user to observe and affect each function of the utility. By pressing the second program key switch 33, the user may advance incrementally through the current function of the programmable closure utility, thereby allowing the user to either increase or decrease the value in the function selected in program key switch 32. By pressing the third program key switch 34, the user may select, or enter, the specific information currently displayed by the interface display after utilizing program key switches 32 and 33, to thereby place that specific information into the memory of the programmable closure utility. The exterior portions of a programming interface may also consist of a ten-key keypad (not shown), or other programming interface. Optionally, the user may employ a serial port 36 to program the programmable closure utility. Whatever the form of the programming interface, it is electrically connected to the remainder of the programmable closure utility, to thereby affect operation of the invention.

FIG. 1 also shows an optional slot 9 by which a user may place objects into the container without first opening the door 12, which objects may be retrieved when the current time and date matches the target date. While the slot appears in the door in FIG. 1, the slot 9 may instead be formed in any convenient fixed wall of the container.

Figure 3:
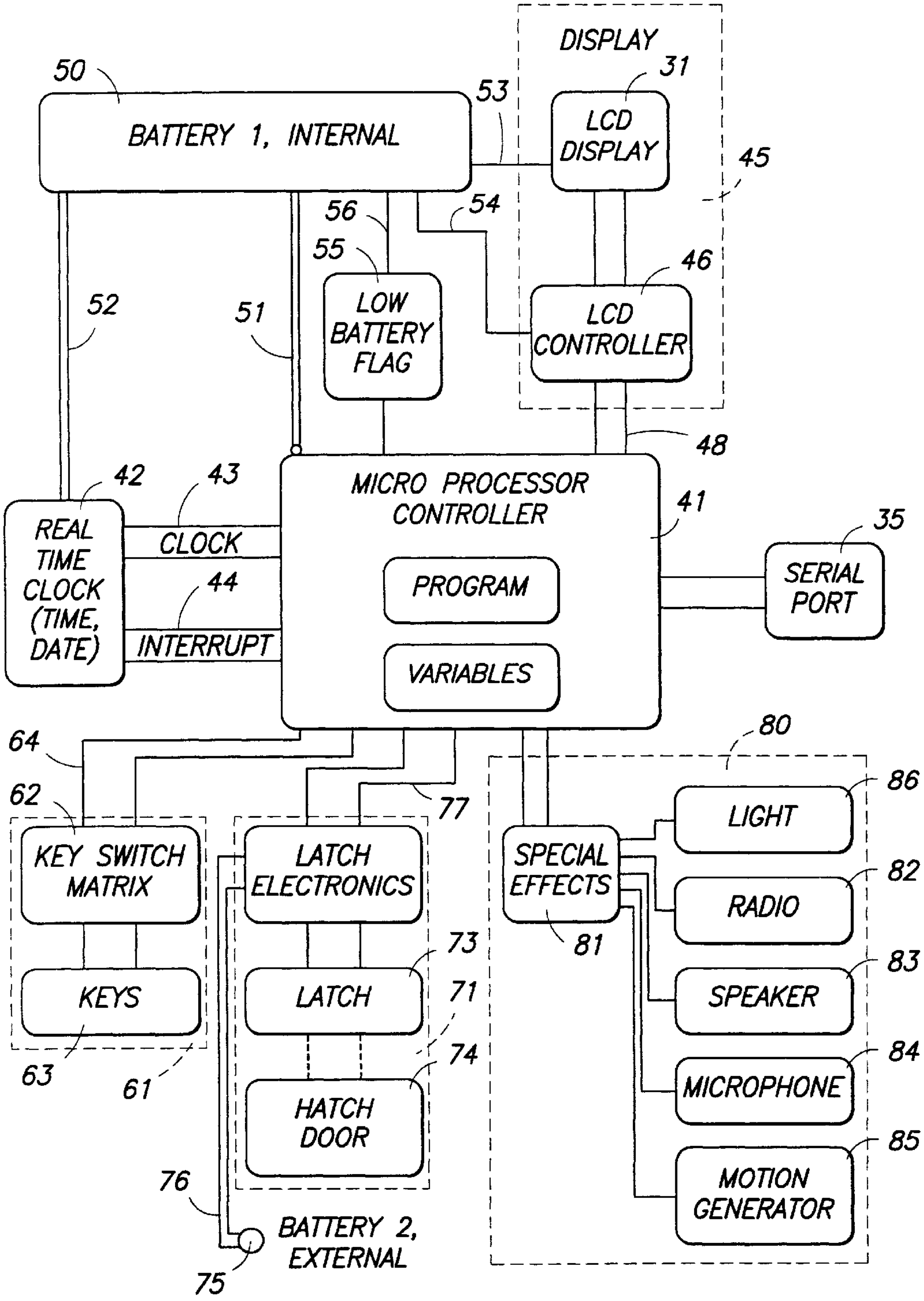
FIG. 3 is schematic block diagram of a first preferred embodiment of the present invention showing the major functions of the invention.

In FIG. 3, one preferred embodiment of the programmable closure utility of the present invention is shown in schematic block diagram form. In FIG. 3, the programmable closure utility is controlled by micro processor 41, a processor of standard design in the electronics industry, such as that selling under part number MC68HC805C4. Clock and timing functions of the utility are provided by real time clock 42, which is electrically connected to micro processor 41 through clock I/O connection 43 and interrupt I/O connection 44. The real time clock 42 may be of the energized crystal, integrated circuit, or other type of standard design in the electronics industry, such as that selling under part number MC68HC68T1, so long as the clock 42 may maintain the current date and time for use by the micro processor in creating a "match" between the current date and time and one or more target dates and times set by the user, and so long as the clock 42 provides timing control and interrupts appropriate to the operation of the particular micro processor 41 at hand, and its various I/O functions.

A display means 45 is also shown in FIG. 3, along with its associated display means I/O connection 48. The display means 45 will usually consist of an integrated LCD display 31 and associated LCD controller 46, however these components may be separately provided. The display means 45 and associated electrical connections constitute the aforementioned display interface by which the user, through the programmable closure utility and the LCD display 31, may observe the status of the container closure, and may observe other messages set for display by the user or the manufacturer. A low battery "flag" 55, that is, a means for indicating the status of the charge of the main battery, is shown in FIG. 3, along with connections 56 from the main battery 50 to the micro processor 41. The real time clock 42 and display means 45 may be incorporated into the microprocessor 41 with appropriate modifications of the microprocessor to accommodate these functions.

A replaceable main battery 50 is also shown in FIG. 3, along with power connection 51 from the main battery to the micro processor 41, power connection 52 from the main battery to the real time clock 42, power connection 53 from the main battery to the LCD display 31, and power connection 54 from the main battery to the LCD controller 46.

Programming of the programmable closure utility takes place by means of a programming interface 61 appearing in FIG. 3, consisting of programming keys 63 with the individual program key switches 32, 33, and 34 appearing in FIGS. 1 and 2, and key switch matrix 64, each of which are electrically connected to micro processor 41 through programming I/O connection 64. As noted herein, the programming interface 61 is the mechanism by which a user may affect the status of the closure, and program the closure of the invention according to the user's wishes.

A locking interface 71 is also shown in FIG. 3, along with its associated locking interface I/O connection 77. The locking means 71 will usually consists of a hatch 74, consisting of the container door 12 and associated hinges 13 shown in FIGS. 1 and 2, latch 73, consisting of deadbolt 15 and associated deadbolt receiving piece 16, each of which pieces are shown in FIGS. 1 and 2, latch electronics 72, including an actuator (not shown), usually consisting of a small direct current motor, servo, or solenoid, and associated control electronic components, and replaceable secondary, auxiliary, or "backup," battery 75, which is accessible from the exterior of the lockbox. The latch electronics 72 and backup battery 75 are usually connected electrically by secondary battery connection 76. However, the auxiliary battery may also be connected in such fashion as to act as a secondary power source for the programming functions of the lockbox when the main battery 50 is discharged, nearly discharged, or removed for replacement. This connection may automatically switch power from the main battery 50 to the auxiliary battery 75 when the low battery flag 55 indicates a low charge on the main battery, or this connection may be as simple as connecting main battery and auxiliary battery in parallel. Latch electronics 72 may also include a micro switch to sense the position of the actuator or the door of the lockbox. The components of the locking interface 71 are arranged, interconnected, and connected to the micro processor 41 to energize the actuator at the command of the utility, and thereby slide back the deadbolt 15 or other latching means out of engagement with the receiving piece 16 at the appropriate time as directed by the user. The actuator will in the usual case be contained within interior compartment 14 shown in FIGS. 1 and 2.

An optional "special effects" interface 80 is also shown in FIG. 3, whereby the user may cause the programmable closure utility to alert the user or others of various events. Special effects interface may consist of circuitry designed to provide a signal to one or more external components, such as a radio 82, speaker 83, microphone 84, motion generator 85, or lights 86. In the alternative one or more of such components may be physically incorporated into the invention, such that the invention produces one or more aurally or visually perceptible signs at a time or event selected by the user or manufacturer. FIG. 3 also shows an optional serial port 35, and associated serial port connection 91, which may be employed by the user to program the programmable closure utility or read messages supplied by the user or the manufacturer.

Figure 4:
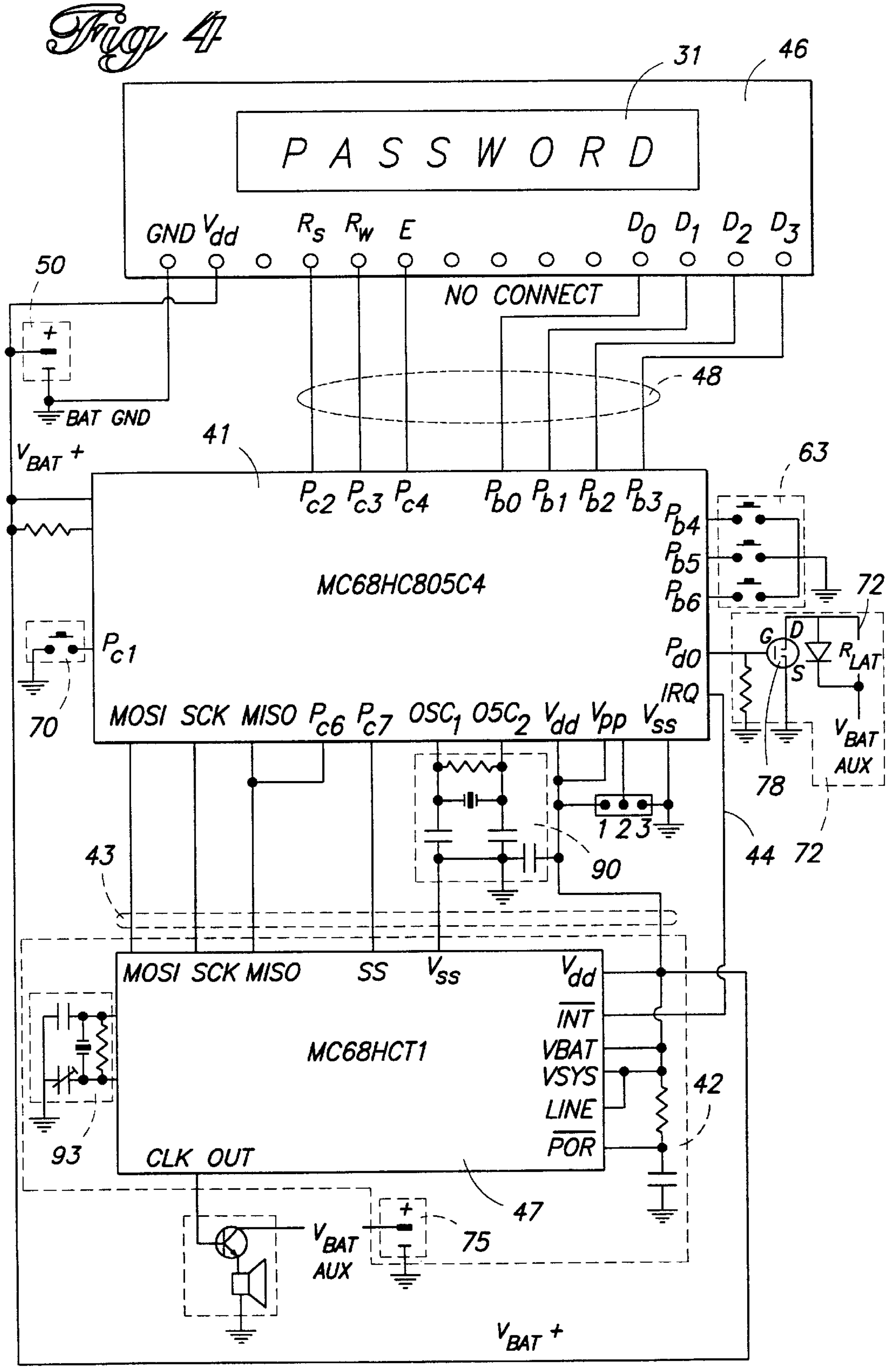
FIG. 4 is schematic diagram of a first preferred embodiment of the present invention showing major components of the invention, as well as connections therebetween.

In FIG. 4, a specific preferred embodiment of the programmable closure utility of the present invention is shown in schematic diagram form, with specific reference to part numbers common to the electronics industry. In FIG. 4, port I/O pins PC2 through PC4 and PB0 through PB3 of micro processor 41 are directly connected to the RS, R/W, E, and D0 through D3 pins of the LCD controller 46 of the display means 45 by display means I/O connection 48, with the result that micro processor 41 may control presentation of alphanumeric characters on the LCD 31 integrated with the LCD controller 46 consistent with instructions supplied by microprocessor 41. The control I/O pin PB0 of micro processor 41 is directly connected to the latch electronics 72, with the result that micro processor 41 may control operation of the latch electronics, and particularly the operation of MOSFET 78 within the latch electronics, and thereby energize the opening motor, servo, solenoid, or other latch actuator 79 and, in turn, the deadbolt 15 of the latch 73. MOSFET 78, or similar part, desirable to control the operation of the latch actuator 79 is in this embodiment, as a motor, servo, solenoid, or other similar device will draw significant transient current at activation. The micro processor chosen for this specific embodiment, Motorola MC68HC8O5C4, has contained in it key switch matrix 64, to which are connected programming keys 63 through port I/O pins PB2 through PB4 of the micro processor 41. As a result, the user may program the programmable closure utility of the present invention by pressing the individual program key switches 32, 33, and 34, to send desired signals to micro processor 41 to operate the latch electronics 72 and open the latch 73 at the appropriate time. FIG. 4 also shows micro switch 70 which senses the position of the deadbolt 15 or the container door 12 to determine if the lockbox is locked or unlocked, which information is used by the programmable closure utility to provide appropriate signals to a user when the auxiliary battery 75 holds insufficient charge to cause the latch actuator 79 to unlock the invention.

Also in FIG. 4, control I/O pins MOSI, SCK, MISO, PC6, and PC7 of micro processor 41 are directly connected to matching I/O pins of the real time clock 42, while control I/O pins OSC1 and OSC2 of micro processor 41 are indirectly connected to matching I/O pins of the real time clock 42 through first crystal oscillator 90. First oscillator 90, connected directly to micro processor 41 and having a watch crystal operating within a range of about 32 kilohertz, controls timing operations of micro processor 41 when the processor is operational, while a second crystal oscillator 93, having a second watch crystal operating in a range of about ___ megahertz, controls timing functions of the real time clock 42 when the micro processor 41 is timed out through operation of the interrupt I/O pin of clock chip 47 through interrupt I/O connection 44 with the corresponding IRC I/O pin of micro processor 41. The real time clock 42 may be of the energized crystal oscillator and integrated circuit type, such as that selling under Motorola part number MC68HC68T1, or other type of standard design in the electronics industry which meets the functional requirements of the present invention.

In FIG. 4, all of the above-referenced components are supplied with power from main battery 50, which may be of any type having suitable voltage for LCD controller 46, micro processor 41, and real time clock chip 47, all of which components draw little current in the present configuration. Additionally, micro processor 41 and real time clock 42 are programmed to shut down operation of the micro processor after a set period of time without external stimulation, creating a "time out" during which only the second crystal oscillator 93 and clock chip 47 of the real time clock 42 operate. This power shut down scheme provides a means to preserve the life of the main battery, resulting in a battery life of many years.

Figure 5A:
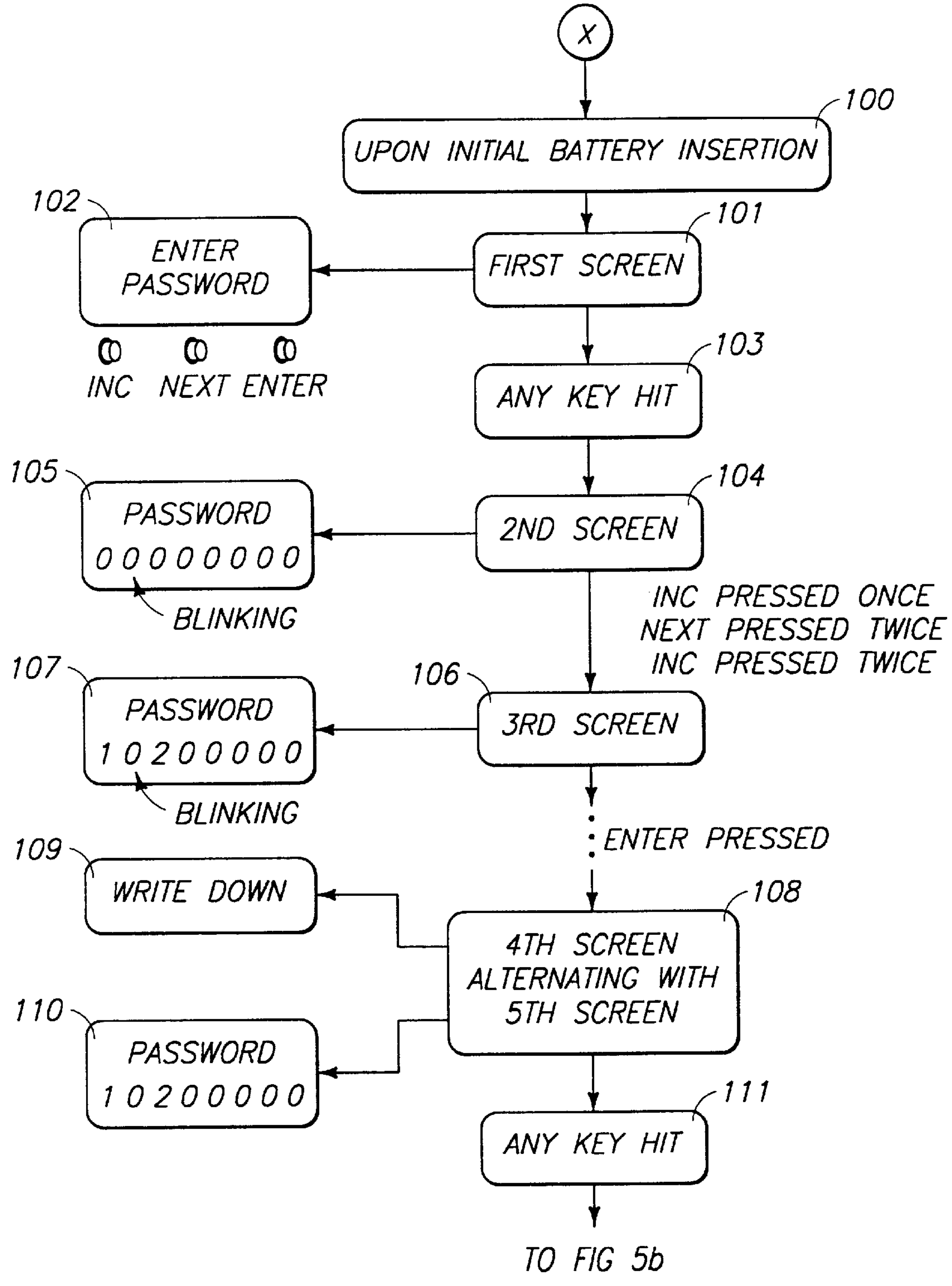
FIG. 5 is a flow chart diagram of the initial startup sequence and the normal operating sequence of the factory-supplied programming, and the resulting messages appearing on the display means as the user enters desired information.
Figure 5B:
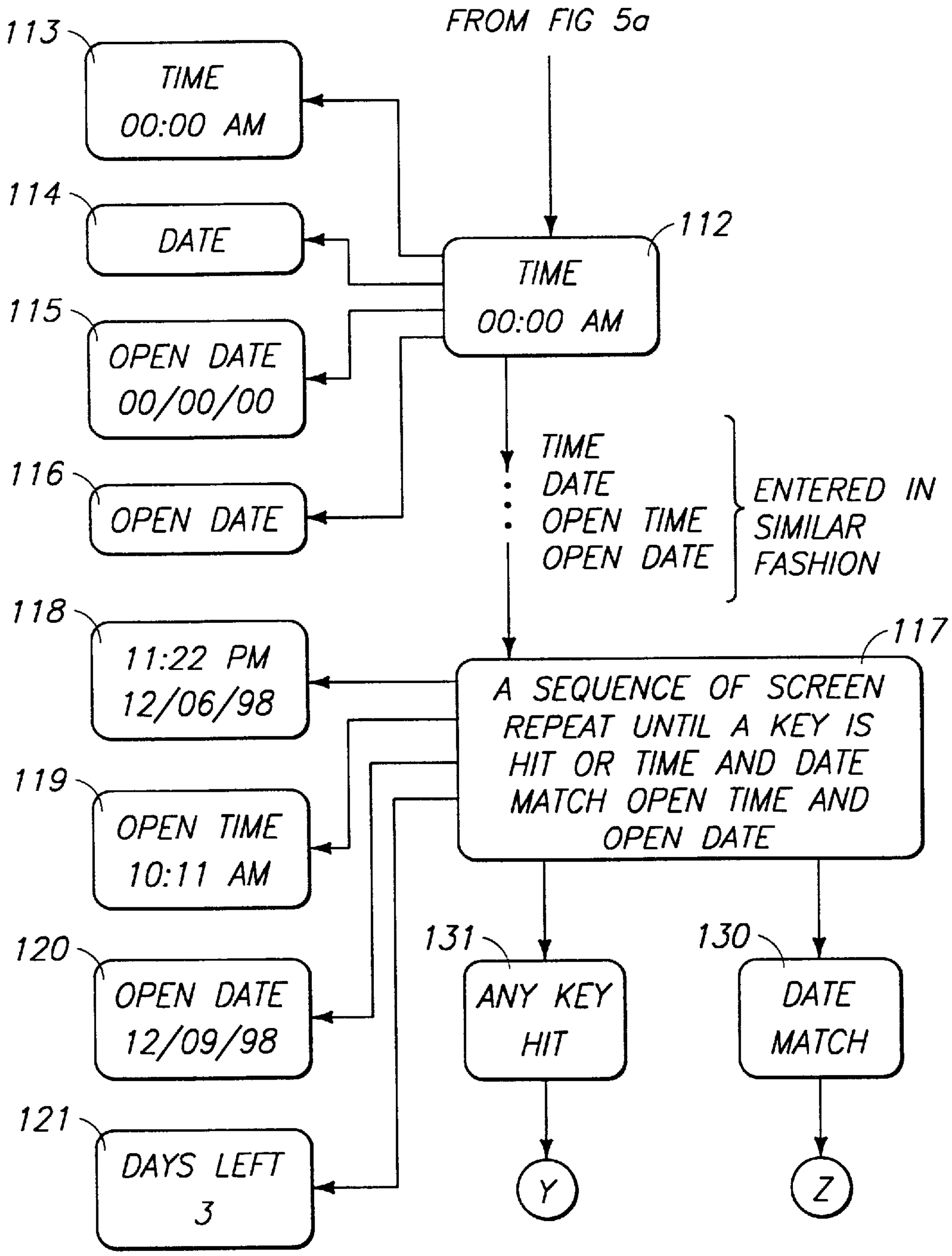
Figure 6:
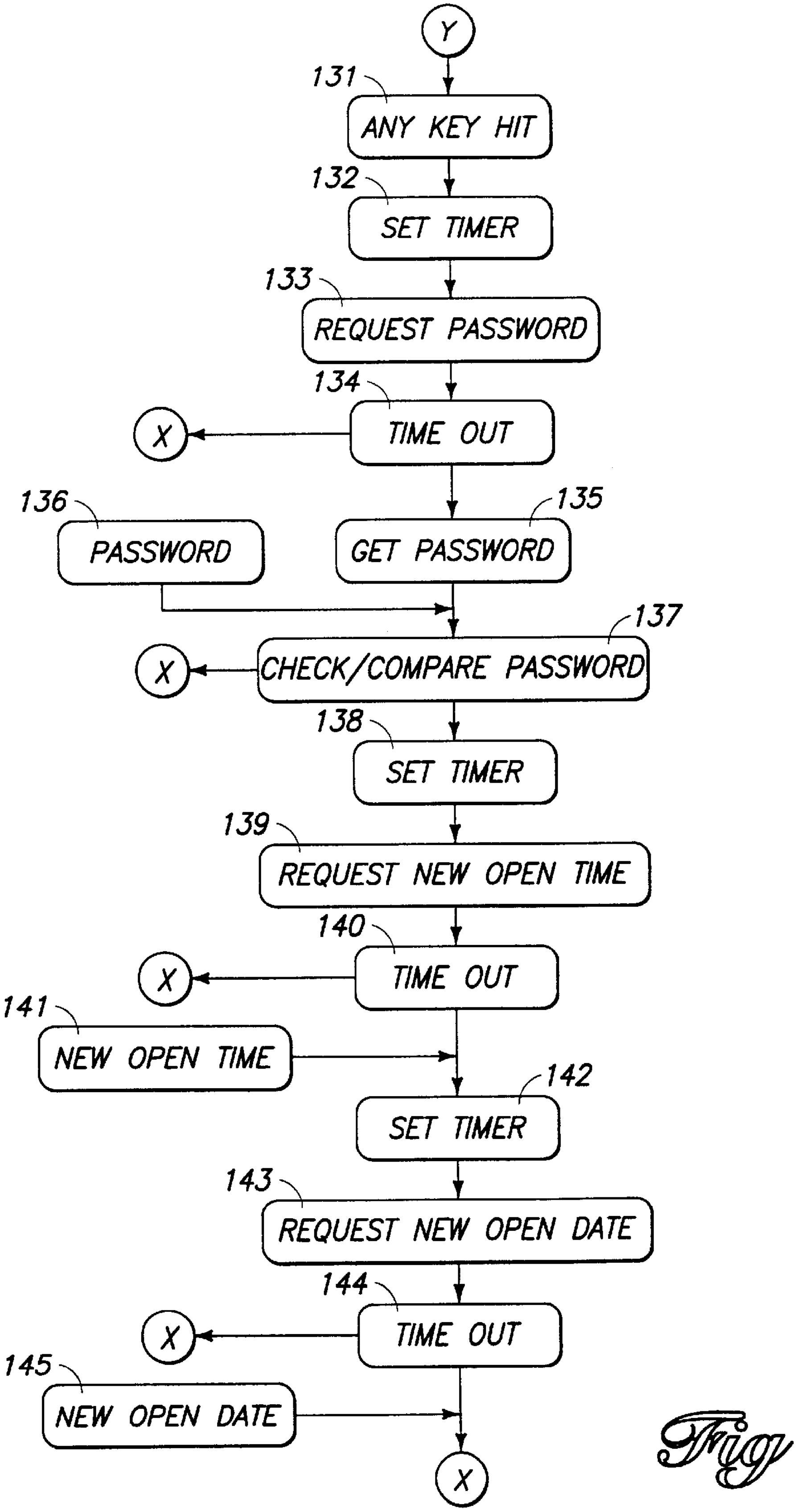
FIG. 6 is a flow chart diagram of the new password sequence of the factory-supplied programming.
Figure 7:
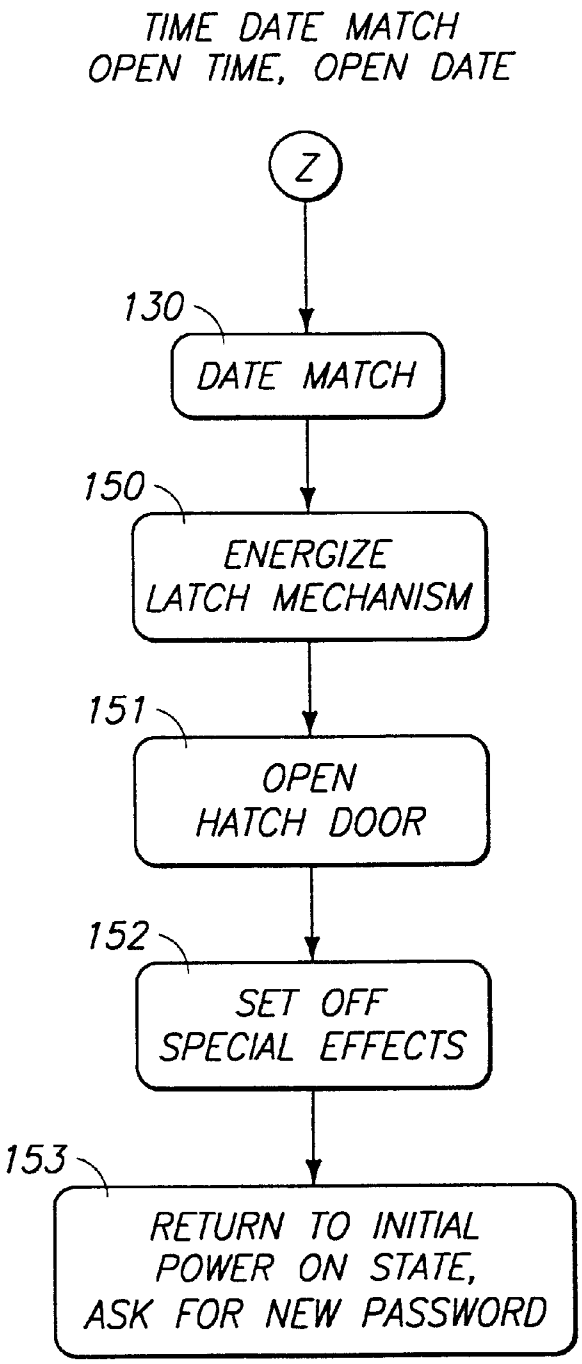
FIG. 7 is a flow chart diagram of the time and date match sequence of factory-supplied programming as the target date and time is matched with the current date and time.

The operation of the lockbox of the present invention is more fully understood by referring to FIGS. 5 through 7. FIG. 5 is a flow chart diagram of the initial startup sequence of the factory-supplied programming, and the resulting messages appearing on the display means. In FIG. 5*a*, power is initially supplied to the invention 100 by insertion of main battery 50, whereupon a first screen 101 is displayed on LCD display 31 showing the message "ENTER PASSWORD" 102. When the user hits any key 103, by pressing one of the program key switches 32, 33, and 34, a second screen 104 is displayed on LCD display 31 showing the message "PASSWORD," and providing a blinking individual LCD 105 to indicate which part of the password is being requested. By pressing the correct program key switches, the user may increment through numbers to reach a number desired by the user for the first position in the intended password, enter that number by pressing another program key switch, and advance, by further screens 106 to further positions in the LCD display 31, to thereby set each number of the password in response to a blinking individual LCD 107 in each position of the display. In this embodiment, the user may then press the appropriate program key switch to enter the password selected, which then results in display of further alternating screens 108 which display the message "WRITE DOWN" 109 and the message "PASSWORD" with the current password as previously entered 110.

At this point the "current" password is set and, upon the user hitting another key 111, the user is presented, in FIG. 5*b*, with a series of further screens 112 wherein the user is asked to provide the current time 113, the current date 114, the time the user sets for the lockbox to open 115 (the "target time"), and the date the user sets for the lockbox to open 116 (the "target date"). Upon further entering this information, the programmable closure utility presents a series of screens, indefinitely, in rotation 117, in which the user or others may see the current time and date 118, the time set for the lockbox to open 119, the date set for the lockbox to open 120, and the number of days between the current date and the date set for the lockbox to open 121. This sequence of screens may be termed the "normal operating sequence." A desired object may be placed within the lockbox at any time up to this point, or through optional slot 9 even after this point, however the door 12 of the lockbox should be closed at this point if it has not been closed already. The programmable closure utility will continue to present the screens of the normal operating sequence until the target time and date is reached 130, or until a user or other person hits one of the program key switches 131.

FIG. 6 is a flow chart diagram of the new password sequence of the factory-supplied programming. In FIG. 6, a user or other person has altered the presentation of screens in the normal operating sequence by hitting one of the program key switches 131, whereupon the programmable closure utility displays the "ENTER PASSWORD" screen, and other screens of the initial startup sequence, and sets a time for timing a response from the user 132. The utility then requests the current password 133, recalls the presently programmed password 135, accepts a information supplied by the user 136, compares the present password with the information supplied by the user 137, and returns to normal operating sequence if the information supplied by the user does not match the present password. If the information supplied by the user does match the present password, however, the programmable closure utility resets the timer 138, and requests a new opening time 139. If the user promptly provides a new opening time 141, the programmable closure utility resets the timer 142, and requests a new opening date 143. If the user promptly provides a new opening date 145, the programmable closure utility accepts all information supplied by the user, and returns to the normal operating sequence. If at any time during this new password sequence the user exceeds the amount of time set by the password timer 132, the new-time timer 138, or the new-date timer 142, the programmable closure utility calls time out 134, 140, and 144, and returns the user to the normal operating sequence.

FIG. 7 is a flow chart diagram of the time and date match sequence of factory-supplied programming as the target date and time is matched with the current date and time. In FIG. 7, the programmable closure utility energizes 150 the latch actuator 79 as the current time and date match the target time and date 130. Upon activation, the deadbolt 15 of the latch 73 out of engagement with the receiving piece 16, thereby allowing the door to open 151 and, at the same time, activating various special effects 152. The programmable closure utility then returns to the initial startup sequence of the factory-supplied programming, generally erasing the old password and requesting a new password.

Figure 8A:
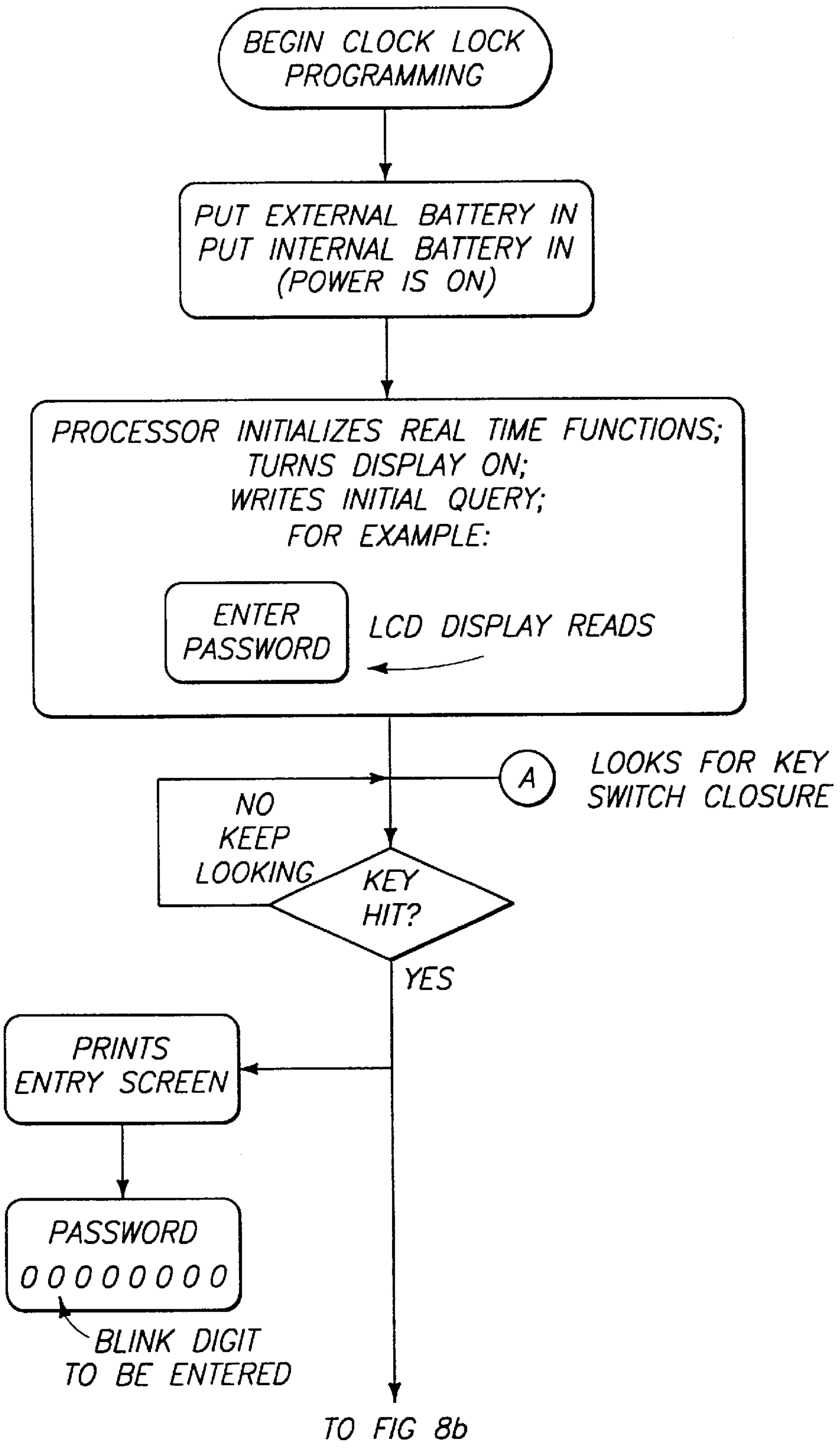
FIGS. 8-10 are flow chart diagrams, supplementary to the description of operation set forth in FIGS. 5-7, which illustrate subroutines executed by the micro processor of FIGS. 3 and 4.
Figure 8B:
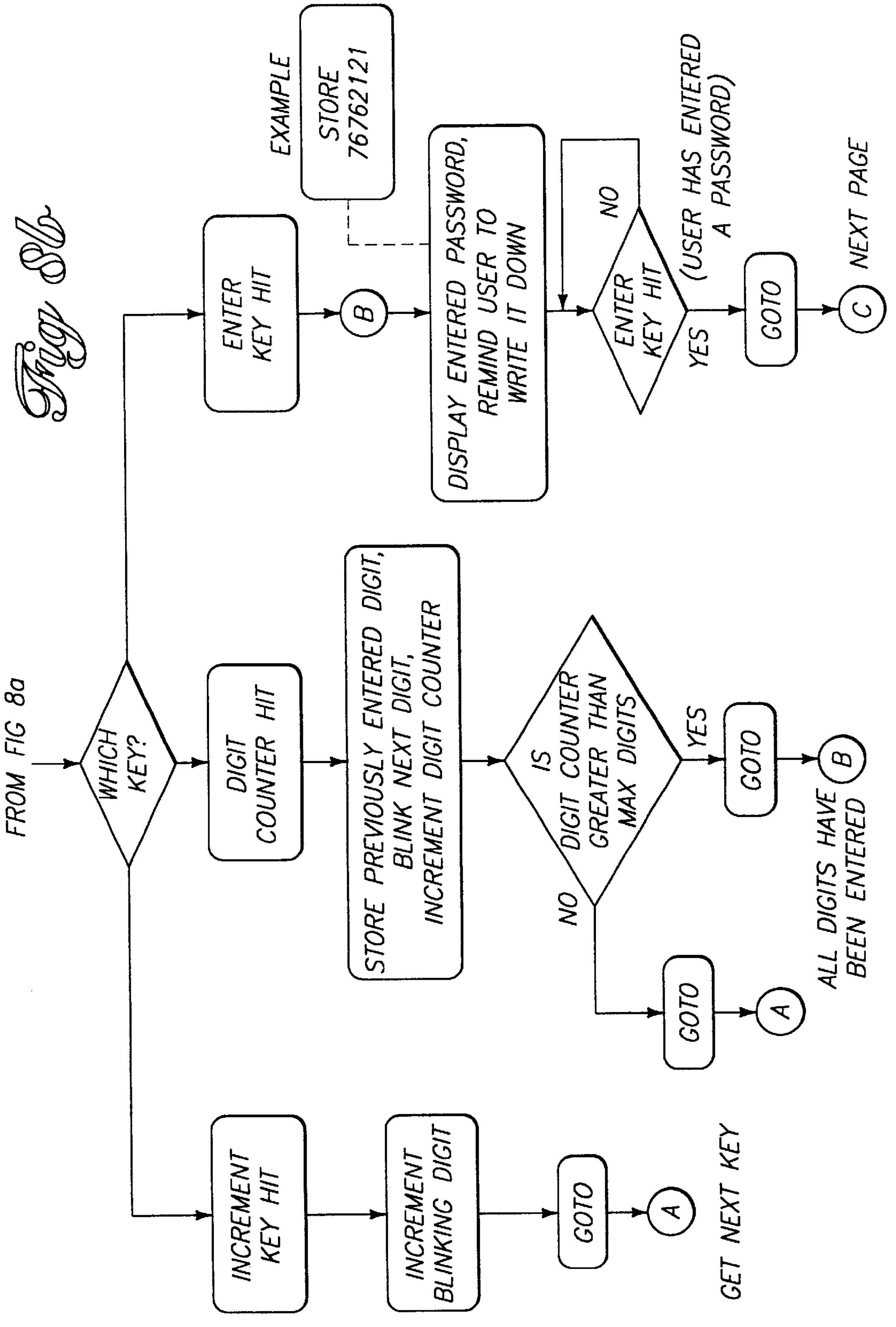
Figure 9A:
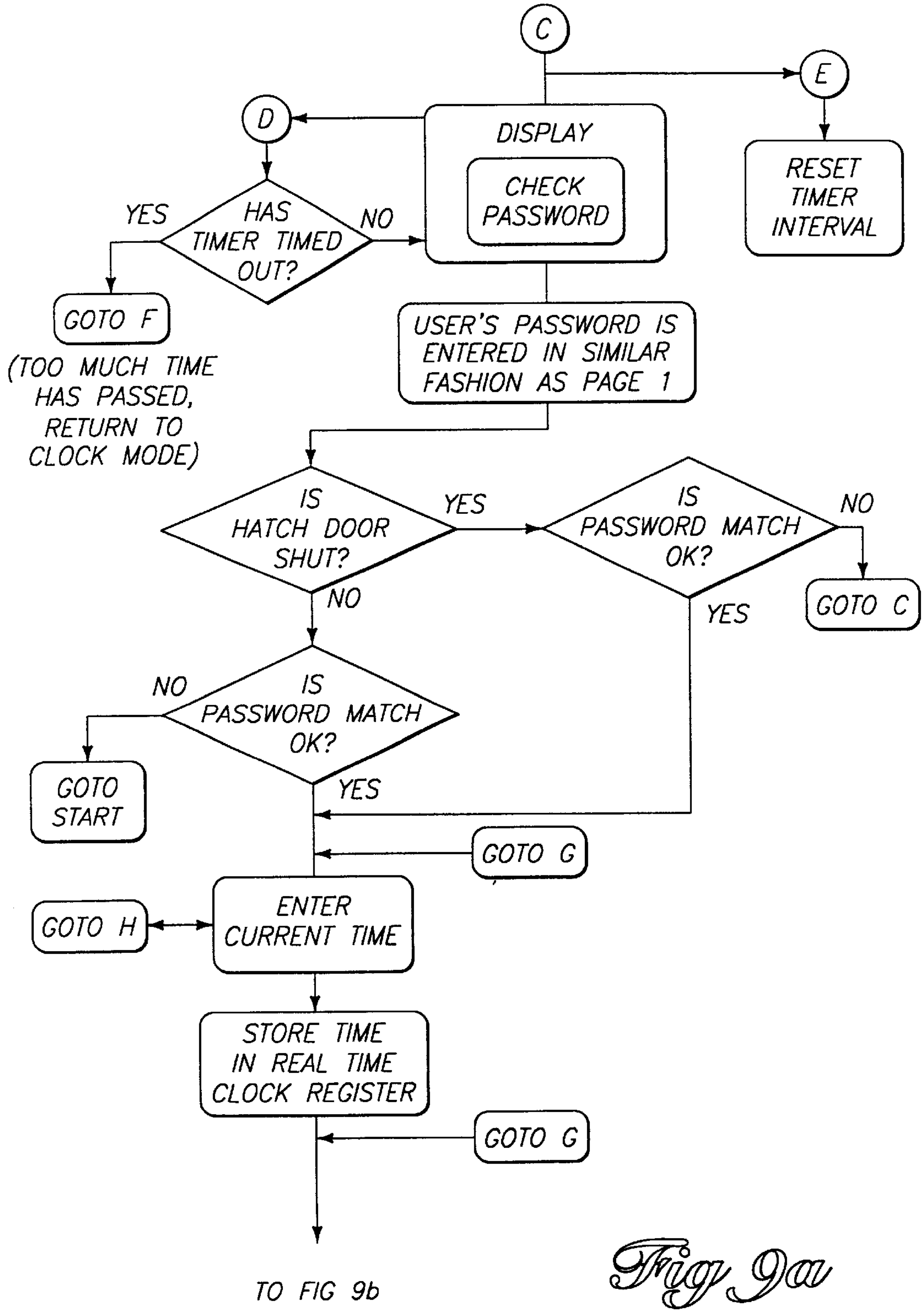
Figure 9B:
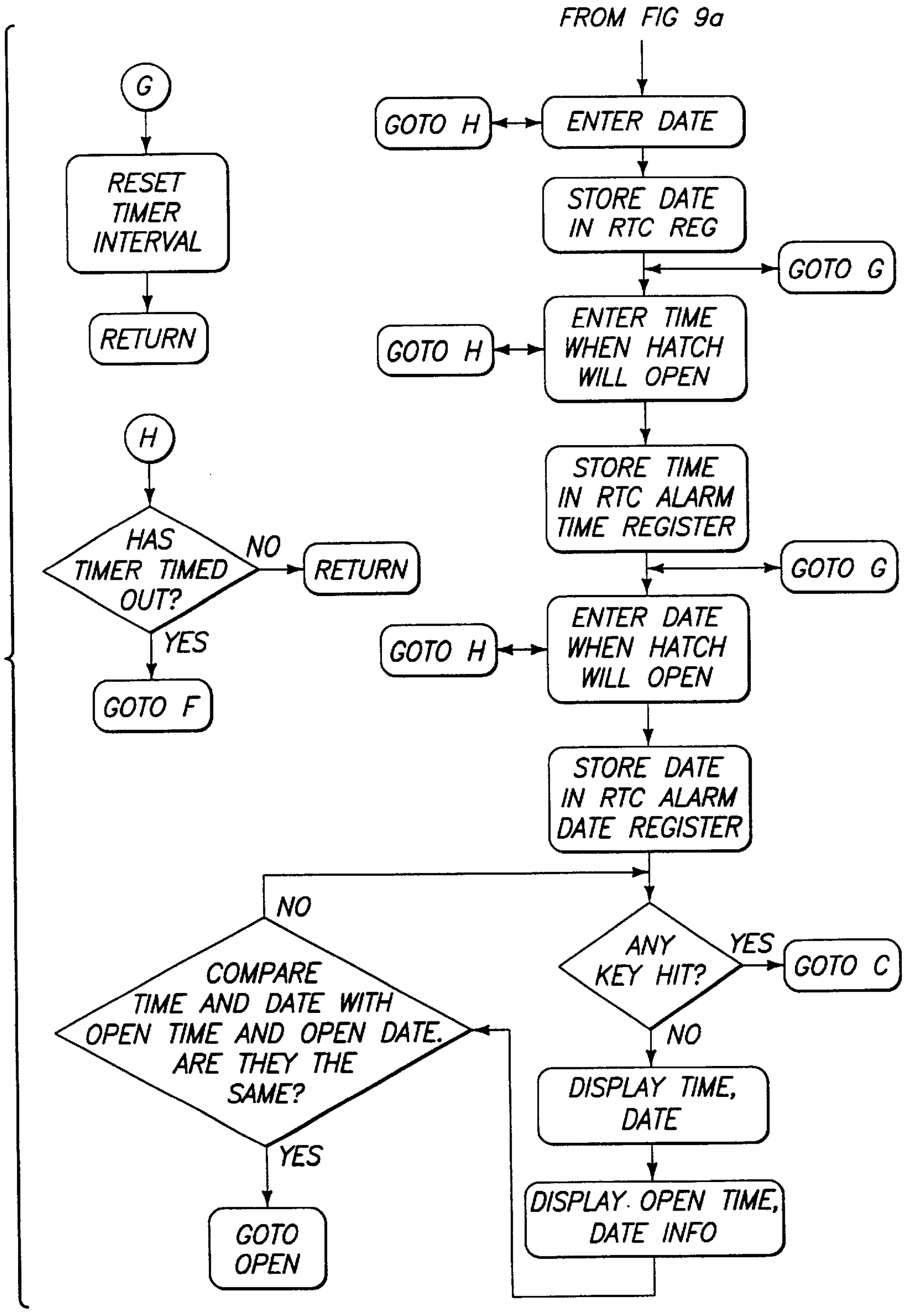
Figure 10A:
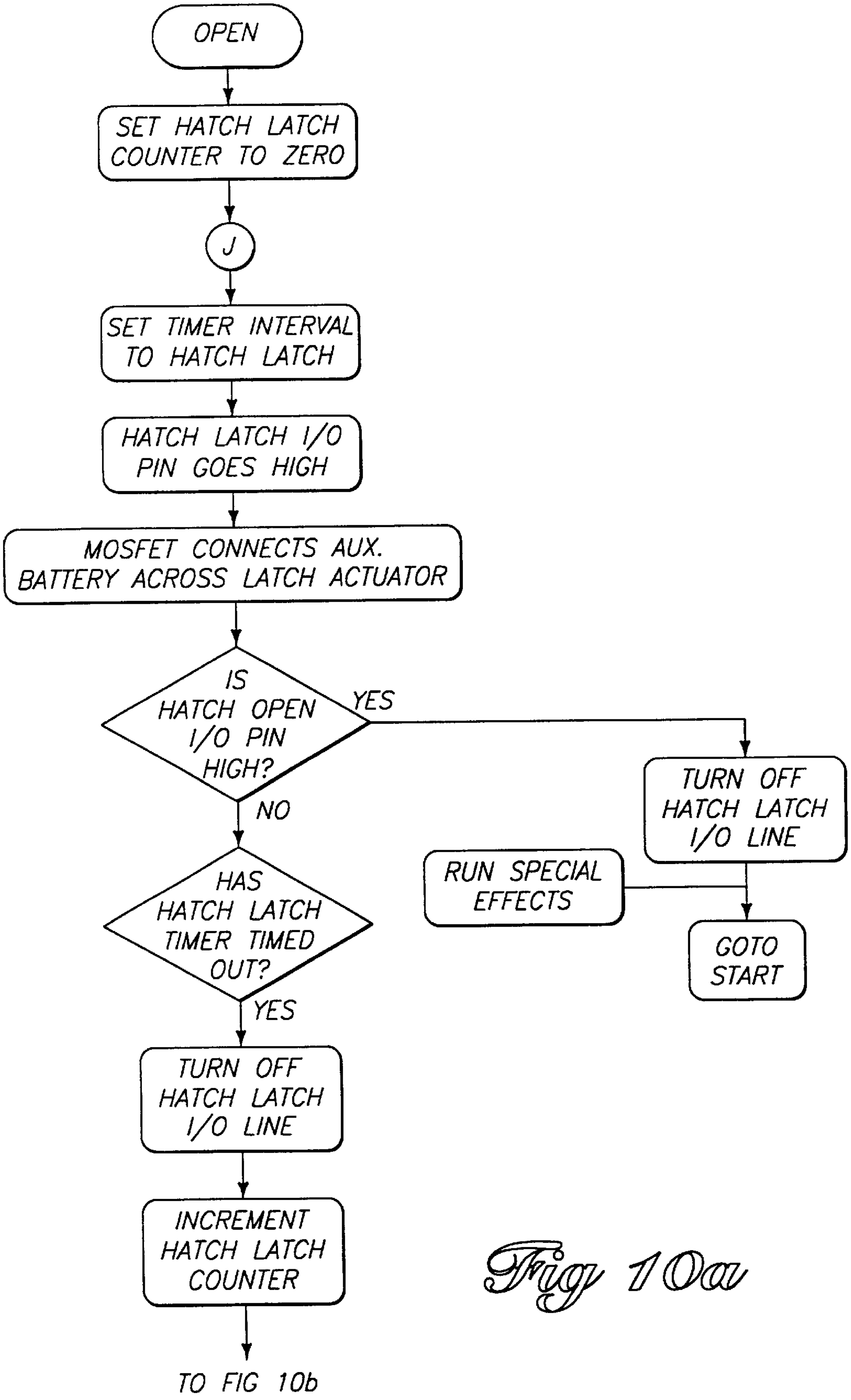
Figure 10B:
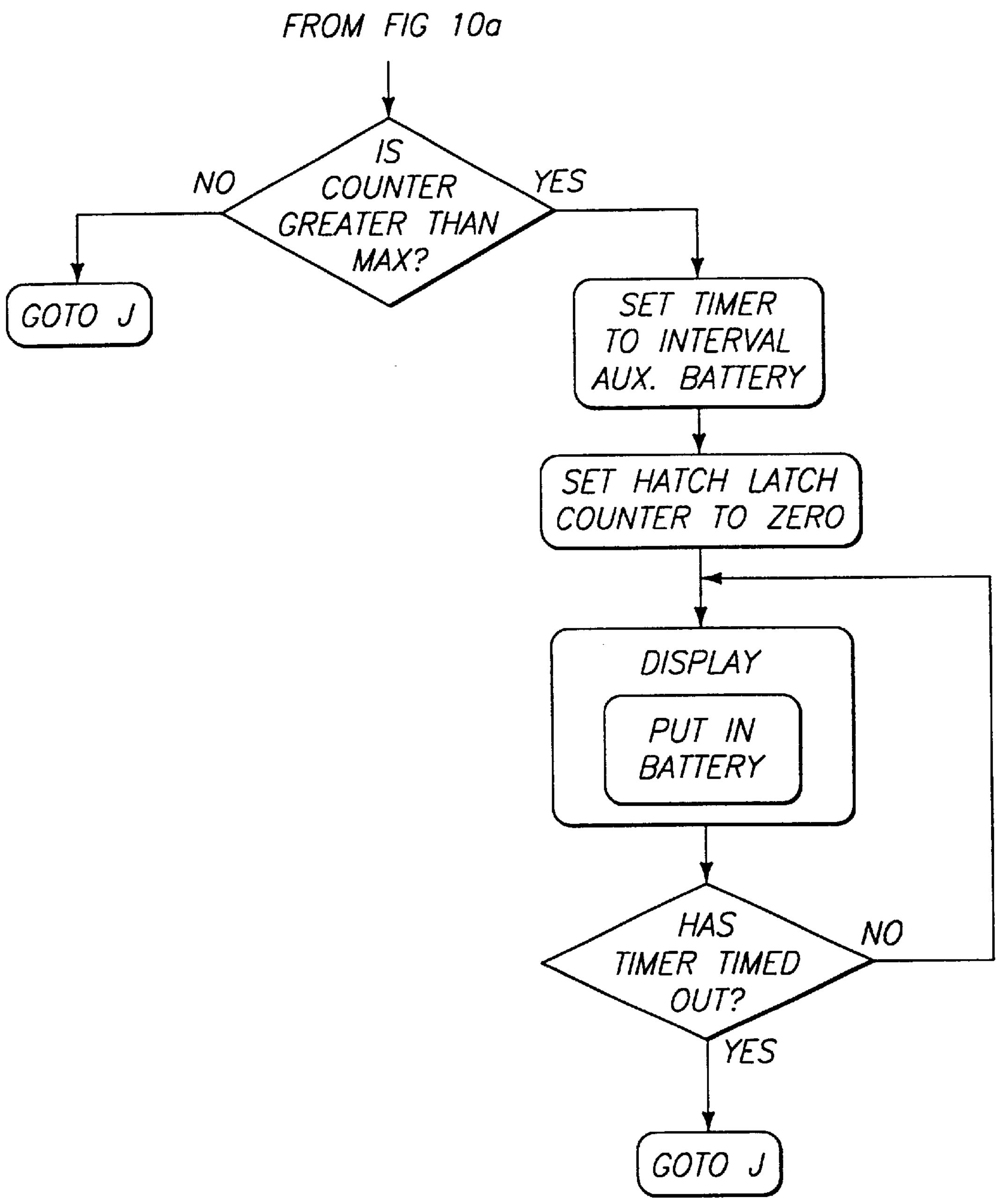

FIG. 8, including FIGS. 8*a* and 8*b*, is a flow chart, supplementary to FIGS. 5 and 6, illustrating the subroutine executed by the micro processor 41 of FIGS. 3 and 4 from the time of applying power, and through intial programming of the password, the target date and time, and the current date and time. FIG. 9, including FIGS. 9*a* and 9*b*, is a flow chart, supplementary to FIGS. 5 and 6, illustrating the normal operation subroutine excuted by the micro processer 41 of FIGS. 3 and 4 after entry of the intial password, times and dates. FIG. 10 is a flow chart, supplementary to FIG. 7, illustrating the subroutine executed by the micro processer 41 of FIGS. 3 and 4 upon and after achieving a match between the current date and the target date.

Other embodiments will be apparent to those skilled in the art in consideration of the specification and practice of the invention disclosed herein. For instance, the present invention may also be manufactured in a pre-programmed version, in which the manufacturer provides a target date and time for opening as well as the instruction set which operates the micro processer and other hardware. Further, the present invention may be manufactured in a yet more limited edition, in which the manufacturer a target date and time for opening, but in which the invention carries no other features by which the user may separately program any functions of the invention. In such an edition, the invention would carry no programming interface by which to affect the running of the invention. Such an edition might also not carry a display interface by which a user could monitor the programming, the progress toward a target date, or any other information about the status of the invention. It is intended that the specification and examples set forth herein be considered as exemplary only, with a true scope of the invention being indicated by the following claims and equivalents.

What is claimed is:

1. A time-lock box, comprising:

a container having an opening through which access to the container interior may be obtained;

a moveable door adapted to cover the container opening when disposed in a closed position;

mechanical locking means for locking the movable door in a closed position over the container opening;

a main battery, accessible only from the container interior, and an auxiliary battery, accessible from the exterior of the container; and a programmable closure utility for controlling the mechanical locking means, comprising a micro processor for controlling operation of the mechanical locking means, means for controlling operation of the micro processor, means for keeping time, means for displaying the status of operation of the micro processor, means for actuating the mechanical locking means, and means for providing instructions supplied by a user to the micro processor to prevent access to the container interior for a period of time.

2. The time-lock box described in claim 1, wherein the programmable closure utility may be programmed to unlock the door at any future time or date chosen by the user.

3. The time-lock box described in claim 1, wherein the programmable closure utility may only be reprogrammed upon entry of a user defined password.

4. The time-lock box described in claim 1, wherein the means for displaying the status of operation of the micro processor comprises a LCD display.

5. The time-lock box described in claim 1, further comprising a means for generating special effects.

6. The time-lock box described in claim 5, wherein the means for generating special effects includes a means for generating an audible sound.

7. The time-lock box described in claim 5, wherein the means for generating special effects includes a light.

8. The time-lock box described in claim 1, further comprising programming for opening the container on a set date.

9. The time-lock box described in claim 1, further comprising a means for indicating the status of charge on the main battery.

10. The time-lock box described in claim 1, wherein the container is formed in the shape of a pyramid.

11. The time-lock box described in claim 1, further comprising a slot formed in the door of the container for placing a deposit within the container.

12. The time-lock box described in claim 1, further comprising a slot formed in one wall of the container for placing a deposit within the container.

13. A time-lock box, comprising:

a container having an opening through which access to the container interior may be obtained;

a moveable door adapted to cover the portable container opening when disposed in a closed position;

mechanical locking means for locking the door in its closed position; a main battery, accessible only from the container interior, and an auxiliary battery, accessible from the exterior of the container; and a programmable closure utility for controlling the mechanical locking means, comprising a micro processor for controlling operation of the mechanical locking means, means for controlling operation of the micro processor, means for keeping time, means for actuating the mechanical locking means, programming for locking the door using the mechanical locking means to prevent access to the container, and programming for unlocking the door using the mechanical locking means.

14. The time-look box described in claim 13, further comprising means for placing a deposit within the looked container without first opening the movable door.

15. A processing control method in a programmably lockable container having a main battery, accessible only from the container interior, and an auxiliary battery, accessible from the exterior of the container comprising the following steps:

setting a first clock date to correspond to the current date;

providing an automated means to progress the first clock date to keep the clock date current;

setting a second clock date to correspond to a target date;

locking the container by a latch mechanism;

comparing the current clock date with the target clock date; and activating the latch mechanism only in response to the automated means when the current clock date is equal to the target clock date, to unlock the lockable container.

16. The processing control method of claim 15, further comprising generating an audible or visual signal upon unlocking the latch mechanism.

17. The processing control method of claim 15, further comprising setting a password, only by use of which password may a user gain further access to reset the first clock date, the second clock date, and the password.

18. The processing control method of claim 17, further comprising displaying the status of the current clock date and the target clock date.

19. The processing control method of claim 15, further comprising displaying the difference between the current clock date and the target clock date.

* * * * *